United States Patent
Gildfind (10) Patent No.: US 10,163,090 B1
(45) Date of Patent: *Dec. 25, 2018

(54) METHOD AND SYSTEM FOR TAGGING OF CONTENT

(71) Applicant: Andrew Joseph Alexander Gildfind, London (GB)

(72) Inventor: Andrew Joseph Alexander Gildfind, London (GB)

(73) Assignee: Google LLC, Mountain View, CA (US)

( * ) Notice: Subject to any disclaimer, the term of this patent is extended or adjusted under 35 U.S.C. 154(b) by 919 days.

This patent is subject to a terminal disclaimer.

(21) Appl. No.: 13/645,424

(22) Filed: Oct. 4, 2012

Related U.S. Application Data (63) Continuation of application No. 13/286,115, filed on Oct. 31, 2011, now Pat. No. 8,306,977.

(51) Int. Cl.
G06F 17/30 (2006.01)
G06Q 20/20 (2012.01)

(52) U.S. Cl.
CPC ......... *G06Q 20/204* (2013.01); *G06Q 20/202* (2013.01)

(58) Field of Classification Search
CPC ..... G06Q 30/02; G06Q 20/204; G06Q 20/202
See application file for complete search history.

(56) References Cited

U.S. PATENT DOCUMENTS

| | | |
|---|---|---|
| 5,651,099 A | 7/1997 | Konsella |
| 5,781,698 A | 7/1998 | Teller et al. |
| 7,016,882 B2 | 3/2006 | Afeyan et al. |
| 7,177,851 B2 | 2/2007 | Afeyan et al. |
| 7,275,017 B2 | 9/2007 | Dini et al. |
| 7,308,418 B2 | 12/2007 | Malek et al. |
| 7,398,261 B2 | 7/2008 | Spivack et al. |
| 7,584,208 B2 | 9/2009 | Spivack et al. |
| 7,610,249 B2 | 10/2009 | Afeyan et al. |
| 7,640,267 B2 | 12/2009 | Spivack et al. |
| 7,730,002 B2 | 6/2010 | Afeyan et al. |

(Continued)

OTHER PUBLICATIONS

Murdoch "Ontology-based query recommendation as a support to image retrieval", Aug. 2008.*

(Continued)

*Primary Examiner* — Tarek Chbouki
(74) *Attorney, Agent, or Firm* — IP Spring (57) ABSTRACT

A system and machine-implemented method for providing a user with a set of user-generated labels for tagging an item, the method including providing an item for display to a user, receiving an indication of a request from a user to tag the item, identifying a user-generated label set including a plurality of user-generated labels uniquely associated with the item, wherein a user-generated label is associated with an item in response to one or more of the user-generated label being previously used to tag the item or the user-generated label being pre-assigned to the item, each user-generated label of the plurality of user-generated labels representing a sentiment regarding the item and being associated with a fitness value, selecting one or more user-generated labels of the plurality of user-generated labels in response to receiving the indication and providing the one or more user-generated labels for display to the user.

22 Claims, 6 Drawing Sheets

(56) References Cited

U.S. PATENT DOCUMENTS

| | | | |
|---|---|---|---|
| 7,908,556 B2 | 3/2011 | Shamma et al. | |
| 8,099,429 B2 | 1/2012 | Deyo et al. | |
| 8,271,902 B1* | 9/2012 | Mangini | H04M 1/72544 |
| | | | 715/763 |
| 2003/0028383 A1* | 2/2003 | Guerin | G06N 3/004 |
| | | | 704/275 |
| 2006/0123278 A1 | 6/2006 | Dini et al. | |
| 2007/0066916 A1* | 3/2007 | Lemos | A61B 3/113 |
| | | | 600/558 |
| 2007/0174247 A1* | 7/2007 | Xu | G06F 17/30722 |
| 2007/0223871 A1 | 9/2007 | Thelen | |
| 2008/0059451 A1 | 3/2008 | Musgrove | |
| 2008/0140679 A1 | 6/2008 | Deyo et al. | |
| 2008/0313570 A1 | 12/2008 | Shamma et al. | |
| 2009/0125934 A1 | 5/2009 | Jones et al. | |
| 2009/0246745 A1* | 10/2009 | Snyder | G06Q 10/10 |
| | | | 434/236 |
| 2009/0327928 A1 | 12/2009 | Dedis et al. | |
| 2010/0010942 A1 | 1/2010 | Kobayashi | |
| 2010/0070851 A1* | 3/2010 | Chen et al. | 715/236 |
| 2010/0107075 A1 | 4/2010 | Hawthorne et al. | |
| 2010/0306655 A1 | 12/2010 | Mattingly et al. | |
| 2010/0306671 A1 | 12/2010 | Mattingly et al. | |
| 2011/0016102 A1 | 1/2011 | Hawthorne et al. | |
| 2012/0174032 A1* | 7/2012 | Greene | G06Q 30/02 |
| | | | 715/811 |
| 2012/0265806 A1* | 10/2012 | Blanchflower | G06Q 10/10 |
| | | | 709/204 |
| 2012/0278064 A1* | 11/2012 | Leary | G06F 17/274 |
| | | | 704/9 |
| 2013/0046756 A1* | 2/2013 | Hao | G06Q 30/0201 |
| | | | 707/723 |
| 2014/0095150 A1* | 4/2014 | Berjikly | G06F 17/2785 |
| | | | 704/9 |

OTHER PUBLICATIONS

Krasnoger, et al., "A Tutorial for Competent Memetic Algorithms: Model, Taxonomy, and Design Issues," Evolutionary Computation, IEEE Transactions on, vol. 9, No. 5, pp. 474-488, Oct. 2005 doi: 10.1109/TEVC.2005.850260 URL: http://ieeexplore.ieee.org/stamp/stamp.jsp?tp=&arnumber=1514472&isnumber=32437.

Murdoch, et al., "Ontology-Based Query Recommendation as a Support to Image Retrieval," 19th Irish conference on Artificial Intelligence and Cognitive Science (AICS), 10 pgs., 2008, Aug. 27-28, 2008, Cork. http://hdl.handle.net/10344/618.

Yu, "Interface and Interaction Design for Group and Social Recommender Systems," In Proceedings of the fifth ACM conference on Recommender systems (RecSys '11). ACM, New York, NY, USA, 2011, pp. 363-366. DOI=10.1145/2043932.2044007, http:/doi.acm.org/10.1145/2043932.2044007.

Crossen, et al., "Flytrap: Intelligent Group Music Recommendation," In Proceedings of the 7th International conference on Intelligent User Interfaces (IU! '02). ACM, New York, NY, USA, pp. 184-185, 2002, DOI=10.1145/502716.502748 http://doi.acm.org/10.1145/502716.502748.

* cited by examiner

METHOD AND SYSTEM FOR TAGGING OF CONTENT

CROSS-REFERENCE TO RELATED APPLICATION

This application claims priority from and is a continuation of U.S. patent application Ser. No. 13/286,115, entitled "Method and System for Tagging of Content," filed on Oct. 31, 2011, now U.S. Pat No. 8,306,977, issued Nov. 6, 2012, which is hereby incorporated by reference in its entirety for all purposes.

BACKGROUND

The subject disclosure generally relates to tagging content, and, in particular, to suggesting tags for tagging content.

Currently, a user browsing online content may indicate an opinion regarding the content, for example by clicking an endorsement button or a similar mechanism. While viewing content, the user may select the button to indicate a positive or negative opinion regarding the content. However, the user is limited to one or two prefixed labels that the user may associate with the content for expressing his/her opinion of the content.

Thus, a method for presenting a user with labels for expressing an opinion regarding online content may be desirable.

SUMMARY

The disclosed subject matter relates to a method executed on one or more computing devices for providing a user with a set of user-generated labels for tagging an item, the method comprising providing an item for display to a user. The method further comprising receiving an indication of a request from a user to tag the item. The method further comprising identifying a user-generated label set comprising a plurality of user-generated labels uniquely associated with the item, wherein a user-generated label is associated with an item in response to one or more of the user-generated label being previously used to tag the item or the user-generated label being pre-assigned to the item, each user-generated label of the plurality of user-generated labels representing a sentiment regarding the item and being associated with a fitness value. The method further comprising selecting one or more user-generated labels of the plurality of user-generated labels in response to receiving the indication and providing the one or more user-generated labels for display to the user.

The disclosed subject matter also relates to a system for providing a user with user-generated labels for tagging content, the system comprising one or more processors and a machine-readable medium comprising instructions stored therein, which when executed by the processors, cause the processors to perform operations comprising receiving an indication of a request to tag content representing an item being displayed to a user, while the user is interacting with the content, the content comprising a content identifier. The operations further comprising identifying a collection of user-generated labels corresponding to the content identifier, each user-generated label of the collection of user-generated labels representing a sentiment regarding the item and being associated with a fitness value, wherein the fitness value for each user-generated label is based on the number of times the user-generated label has been selected for tagging the item and selecting one or more user-generated labels of the collection of user-generated labels based on the fitness value of the user-generated labels.

The disclosed subject matter also relates to a machine-readable medium comprising instructions stored therein, which when executed by a machine, cause the machine to perform operations comprising detecting a user request to tag an item, while the item is being displayed to the user. The operations further comprising identifying a content identifier corresponding to the item. The operations further comprising selecting a set of user-generated labels from a plurality of user-generated labels corresponding to the content identifier, wherein the set of user-generated labels comprises one or more user-generated labels of the plurality of user-generated labels, each of the plurality of user-generated labels representing a sentiment regarding the item, the selecting operation comprising analyzing the sentiment represented by one or more of the user-generated labels of the set of user-generated labels based on the relation of the sentiment represented by the user-generated label to a pre-defined set of basic emotions. The operations further comprising wherein the set of user-generated labels are selected to provide a full spectrum of sentiments regarding the item, such that at least two of the user-generated labels of the selected user-generated labels provide opposite sentiments from one another and providing the set of user-generated labels to be displayed to the user on a display area.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure provides a system for providing a user with an efficient way to tag content with user-generated labels. The system identifies the content being viewed by the user and retrieves a set of suggested user-generated labels for tagging the content. The suggested user-generated labels may be selected based on several criteria including for example the popularity of the user-generated label or user-generated label "fitness" defined by at least the popularity of the user-generated labels which may be expressed as the number of users that have tagged the content with the user-generated label. For example, the user-generated labels may be selected from the set of user-generated labels associated with the content being viewed by the user according to a fitness proportionate algorithm.

Furthermore, the suggested user-generated labels may be selected by the system and/or provided for display to the user based on sentiment analysis of the user-generated labels. For example, where the system presents the user with a first user-generated label "love" (e.g., selected based on the fitness of that user-generated label), the system may further present the user with the user-generated label "hate", "like" and/or "dislike". The user-generated labels may be sorted, according to their sentiment, e.g., love, and hate being the strongest sentiments, and like and dislike presenting a milder sentiment toward the item. The user-generated labels may be presented to the user in variety of layouts (e.g., within a wheel or a list of user-generated labels) according to the fitness of each of the one or more user-generated labels or the sentiment represented by each of the one or more user-generated labels.

As used herein, the term "content" is given its plain and ordinary meaning, including but not limited to any information being consumed by a user and may include audio data, visual data, or a combination thereof. An item such as a web page, article, video clip, audio clip, restaurant, business, movie, person or other items may be represented by a collection of content. The content may be viewable through various mechanisms such as online, at a client software, or other computer based application. The phrase "User-generated labels" is given its plain and ordinary meaning, including but not limited to a text string corresponding to a user sentiment regarding content. The user-generated labels may be limited to a small number of characters or words, such that the user-generated label represents a singular sentiment (e.g., love, hate, dislike). User-generated labels may be generated by one or more of users, system or content developers, or other individuals or entities. A user may express an opinion regarding an item by tagging the content representative of the item with a user-generated label. Furthermore, as used herein, the term "Tagging" is given its plain and ordinary meaning including but not limited to associating a user-generated label to a particular content to express an opinion regarding an item represented by the content.

Figure 1:
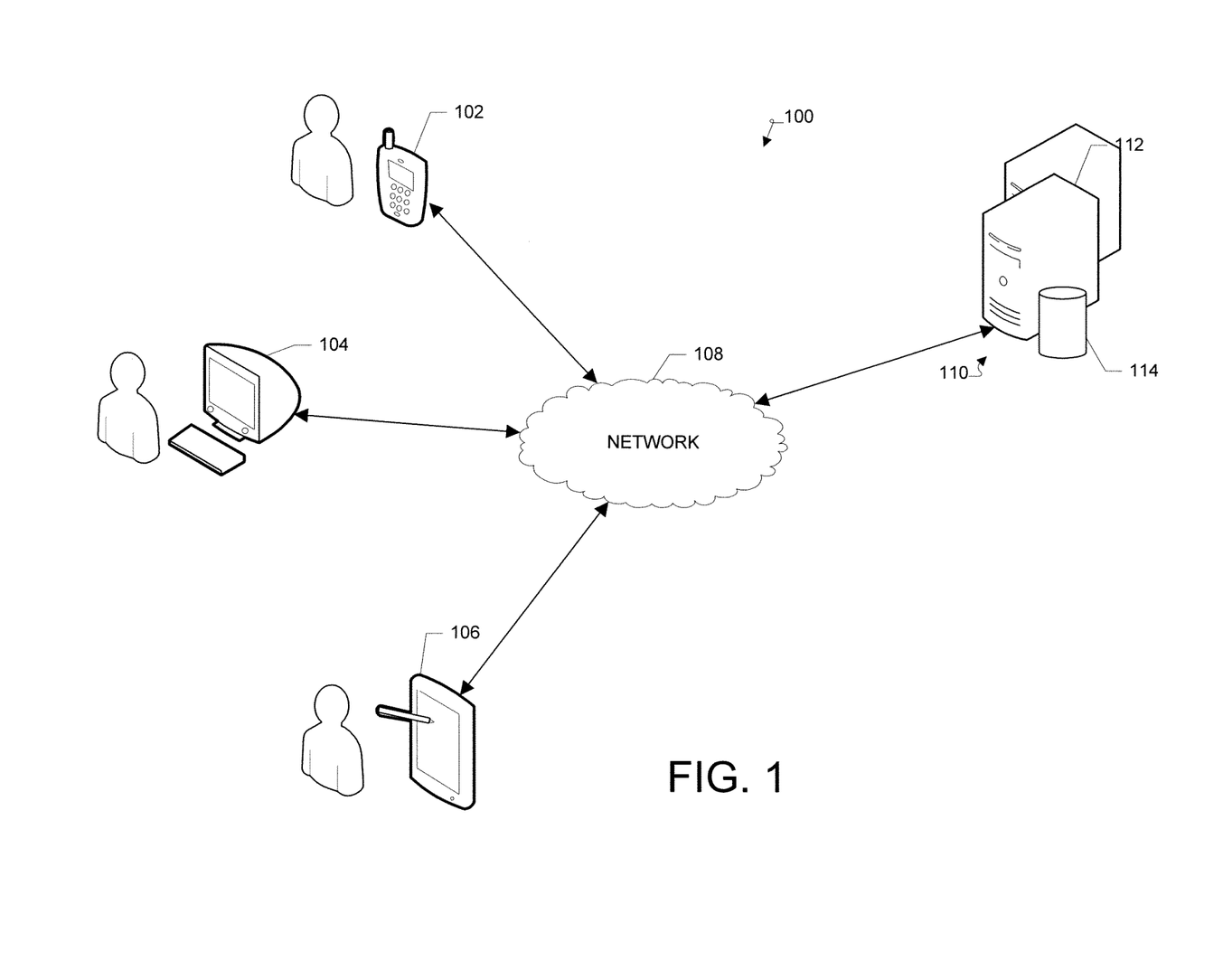
FIG. 1 illustrates an example client-server network environment which provides for providing user-generated labels to a user for tagging content.

II. Example Client-Server Network Environment for Facilitating Tagging of Content FIG. 1 illustrates an example client-server network environment which provides for providing user-generated labels to a user for tagging content. A network environment 100 includes a number of electronic devices 102, 104 and 106 communicably connected to servers 110 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices. In the example of FIG. 1, electronic device 102 is depicted as a smartphone, electronic device 104 is depicted as a desktop computer and electronic device 106 is depicted as a PDA.

The servers 110 can be any system or device having a processor, a memory, and communications capability for hosting various services. In one embodiment, one or more servers 110 include a processing device 112 and a data store 114. Processing device 112 executes computer instructions stored in data store 114, for example, to provide user-generated labels for display to users interacting with electronic devices 102, 104 and 106. Servers 110 may further be in communication with one another either through the network 108 or through another network or communication means.

In some example aspects, one or more servers 110 can be a single computing device such as a computer server. In other embodiments, servers 110 can represent more than one computing device working together (e.g., cloud computing). In some embodiments, servers 110 may be coupled with various remote databases or storage services. Communications between the client devices 102, 104 and 106, and one or more servers 110 may be facilitated through the HTTP communication protocol. Other communication protocols may also be facilitated including for example, XMPP communication, for some or all communications between the client devices 102, 104 and 106, and/or one or more servers 110.

The one or more servers 110 may be implemented as one or more local or remote servers in communication with one another to perform the selection and presentation of user-generated labels for tagging content. For example, the system may include a local tagging client application (e.g., at the user client device and/or hosted by servers 110), and a tag server and a sentiment analysis server (e.g., hosted by servers 110) communicatively coupled with the local client application. The local client application, the tag server and sentiment analysis server may be implemented locally within a single device or may be implemented at one or more remote servers or computing devices in communication with one another over a network.

Users may interact with the server 110 (e.g., representing the tag server and/or sentiment analysis server), through the client application installed at the electronic devices 102, 104 and 106. Alternatively, users may interact with the system and/or the one or more social networking sites through a web based browser local client application at the electronic devices 102, 104 and 106. Communication between client devices 102, 104 and 106 and the one or more servers (e.g., tag server and/or sentiment analysis server) may be facilitated through a network (e.g., network 108).

The tag server may maintain collections of user-generated labels each associated with a specific content identifier (e.g., a content address or other content identifier) identifying content corresponding to an item. The set of user-generated labels may for example correspond to a specific content identifier corresponding to an item generally, or may be more specifically associated with a more specific instance of the item defined by a content identifier corresponding to the specific instance of the item. Thus, the user-generated labels for a collection of content (e.g., representing an item or an instance of an item) may be maintained according to the content identifier corresponding to the content.

The content identifier defining an item may be a simple content identifier (e.g., a URL or other identifier of the content representing an item) or a qualified content identifier. The qualified content identifier may be defined by the content identifier corresponding to the content collection (e.g., an item or instance of the item) and additional context information defining the specific context in which the content is being viewed. The context information may include user identification, time, location (e.g., the geographic location of the user), content location (i.e., the location of the user within the content) and other similar information regarding the context in which content is being viewed that may define different instances of an item. For example, a webpage may be presented to a set of users in different locations, speaking different languages, being of different demographics. Information regarding the location of the user may be used to identify the specific instance of the webpage referring to a specific subset of users.

When a user interacting with content representing an item creates a user-generated label or selects an existing user-generated label (e.g., a user-generated label displayed to the user) and associates the user-generated label with the content (i.e., tags the item with the user-generated label), the local client application transmits an indication of the association of the user-generated label with the item to the tag server to. The tag server may use the information to update the tag pool associated with the item to reflect the selection by the user. For example, upon receiving the indication of the selection of the user-generated label with respect to the content, the local client application may send the content identifier (e.g., simple and/or qualified content identifier) and the selected user-generated label to the tag server. The local client application may further identify context information associated with the content. In one instance, the local client application may generate a qualified content identifier including the content address and one or more context information.

The collected information (e.g., content identifier, the selected user-generated label and/or context information) is then transmitted to the tag server. Upon receiving the information, the tag server may update the collection of user-generated labels associated with the content identified based on the content identifier and/or the one or more context information to reflect that the user selected the specific user-generated label in association with the content (e.g., the user-generated label counter is incremented to reflect the increase in the fitness/popularity of the user-generated label). The information received at the tag server may further be used by the tag server to update more than one user-generated labels associated with the content (e.g., tag pool). For example, where the content identifier and/or context information refer to an item and further refer to a specific instance of the item, the user-generated label may be added (or incremented) within the label collection (e.g., tag pool) for both the item and the specific instance of the item (e.g., where the tag server maintains a hierarchical user-generated label collection for an item). Accordingly, the tag server maintains a collection of user-generated labels for each of one or more collections of content (e.g., item or specific instance of item) that users may wish to express an opinion about.

When a user viewing the content representing an item (or instance of the item) selects to tag the content, the local client application may communicate with the tag server to receive a set of user-generated labels for presentation to a user interacting with a client device (e.g., electronic devices 102, 104 and 106). Upon receiving an indication that a user wishes to tag the item (e.g., once a user selects a tag button or otherwise makes a gesture indicating that the user wishes to tag the content), the local client application may identify and provide the tag server with the content identifier (or qualified content identifier including contextual information) associated with the content being viewed by the user.

For example, while viewing content (e.g., online content), the user may be provided with an endorsement button. Upon selection of the button, the local client application may contact the tag server and request user-generated labels corresponding to the item viewed by the user and provide the user with a list of suggested user-generated labels for the item. In one aspect, upon receiving an indication of a request to tag the content (e.g., content corresponding to the item), the client application may identify the content identifier of the item and may query the tag server for a set of suggested user-generated labels corresponding to the content identifier. The tag server receives the content identifier and identifies a collection of user-generated labels associated with the content identifier. The tag server may then select a set of suggested user-generated labels and may provide the selected set of user-generated labels to the local client application for provision to the user.

The tag server may select the suggested user-generated labels according to the "fitness" of the user-generated labels. The tag server may select the set of suggested user-generated labels according to a fitness proportionate selection algorithm wherein the fitness level of each user-generated label is used to associate a probability of selection of that user-generated label. The fitness of each user-generated label may be defined as a function of the number of times the user-generated label has been associated with the content. In addition, to account for newly entered user-generated labels, the tag server may assign a nonzero fitness value to each newly added user-generated label to ensure a chance of the new user-generated labels being selected and represented to the user.

The selection process performed at the tag server may further take time into account in the selection of user-generated labels. That is, in instances where user sentiments may change with regard to content over time, it may be beneficial that the selection of user-generated labels be a function of time. Various mechanisms may be employed in accounting for time in the selection process. In one aspect, the system may record a time stamp each time a user-generated label is selected, and the time stamps may be used in determining a weighted fitness of the user-generated label, such that in essence the fitness of a user-generated label is a function of time. Temporal weighting of the fitness level of each filter over a period of time thus takes into account the effect of time on the sentiment of users towards content.

In addition, the tag server may account for temporal variance in user sentiment by periodically sampling the collection of user-generated labels to create a subset, for example based on the fitness proportionate selection algorithm. The fitness level for all user-generated labels within the subset may be reinitialized. In this manner, the system may maintain variations of user-generated labels where the probability of the selection of a user-generated label is a function of its fitness over time. Yet another solution may include reinitializing the fitness values for the entire collection of user-generated labels periodically, such that the fitness for all user-generated labels within the collection are restarted and recalculated.

For any given content identifier the set of selected user-generated labels can evolve over time to take into account context, both in terms of the location within the content (e.g., the position of the content within a content collection, such as the time marker in a video clip) and changing sentiments over time.

Once the tag server has selected the set of suggested user-generated labels, the tag server may determine one or more display characteristics for the manner of providing to selected user-generated labels to the user. The display characteristics may be provided as additional information along with the set of suggested user-generated labels, and the selected user-generated label may be displayed to the user according to the additional information. For example, the display characteristics may include color, size or spatial position of the visual representation of each user-generated label in relation to other user-generated labels within the set of selected user-generated labels. The display characteristics of the user-generated labels may indicate information regarding the user-generated label individually or in relation to other user-generated labels displayed to the user. For example, the fitness or popularity of a user-generated label (in relation to other displayed user-generated labels and/or all user-generated labels associated with the content) may be visually represented using different display characteristics such as size, color or spatial position.

Additionally, the suggested user-generated labels may be displayed based on sentiment analysis of the user-generated labels. For example, where the system presents the user with a first user-generated label "love" (e.g., selected based on the fitness of that user-generated label), the system may further present the user with the user-generated label "hate", "like" and/or "dislike". The user-generated labels may be sorted, according to their sentiment, e.g., love, and hate being the strongest sentiments, and like and dislike presenting a milder sentiment toward the item.

In one instance, the tag server may be communicatively coupled to a sentiment analysis server. Upon selecting the set of user-generated labels, the tag server may forward the set of select user-generated labels to the sentiment analysis server. The sentiment analysis server may use various mechanisms such as dictionaries, thesauruses and machine learning techniques on large text corpora (e.g., the internet) to analyze the set of selected user-generated labels.

The sentiment analysis of user-generated labels may for example be performed in view of various psychological models such as Plutchick's Psychoevolutionary theory of basic emotions which states that all emotions other than primary emotions are mixed or derivative states, that is, they occur as combinations, mixtures or compounds of the primary emotions. The theory further states that primary emotions may be conceptualized in terms of pairs of polar opposites and that all emotions vary in their degree of similarly to one another. This concept may be the basis for selecting a set of sentiment basis vectors to define emotions on an emotional spectrum of primary emotions (e.g., love and hate, fun and boring). The sentiment analysis of user-generated labels may thus be based on an analysis of each emotion based on its relation to primary emotions on primary word (sentiment) axes. Various other theories or concepts may be used when the system is performing sentiment analysis with respect to the selected user-generated labels.

The sentiment analysis server may generate sentiment analysis information regarding the user-generated labels within the set of selected user-generated labels. The sentiment analysis information may for example include additional display characteristics to portray the sentiment characteristics of the user-generated labels. In addition, the sentiment analysis server may provide suggestion of additional user-generated labels that may be included within the set of suggested user-generated labels (e.g., to provide a full spectrum of sentiment).

For example, where the system presents the user with a first user-generated label "love" (e.g., selected based on the fitness of that user-generated label), the system may further present the user with the user-generated label "hate", "like" and/or "dislike". The user-generated labels may be sorted, according to their sentiment, e.g., love, and hate being the strongest sentiments, and like and dislike presenting a milder sentiment toward the item.

Figure 4:
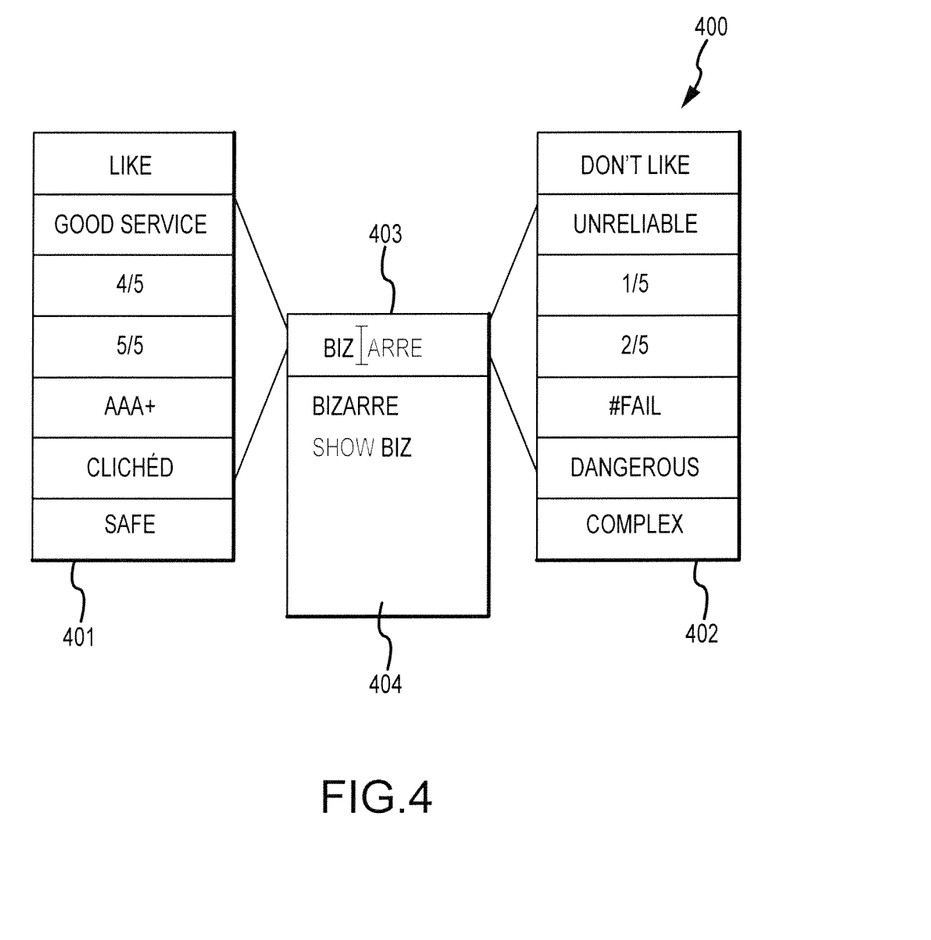
FIG. 4 displays an example user interface displayed to the user in response to a user request to tag content.
Figure 5:
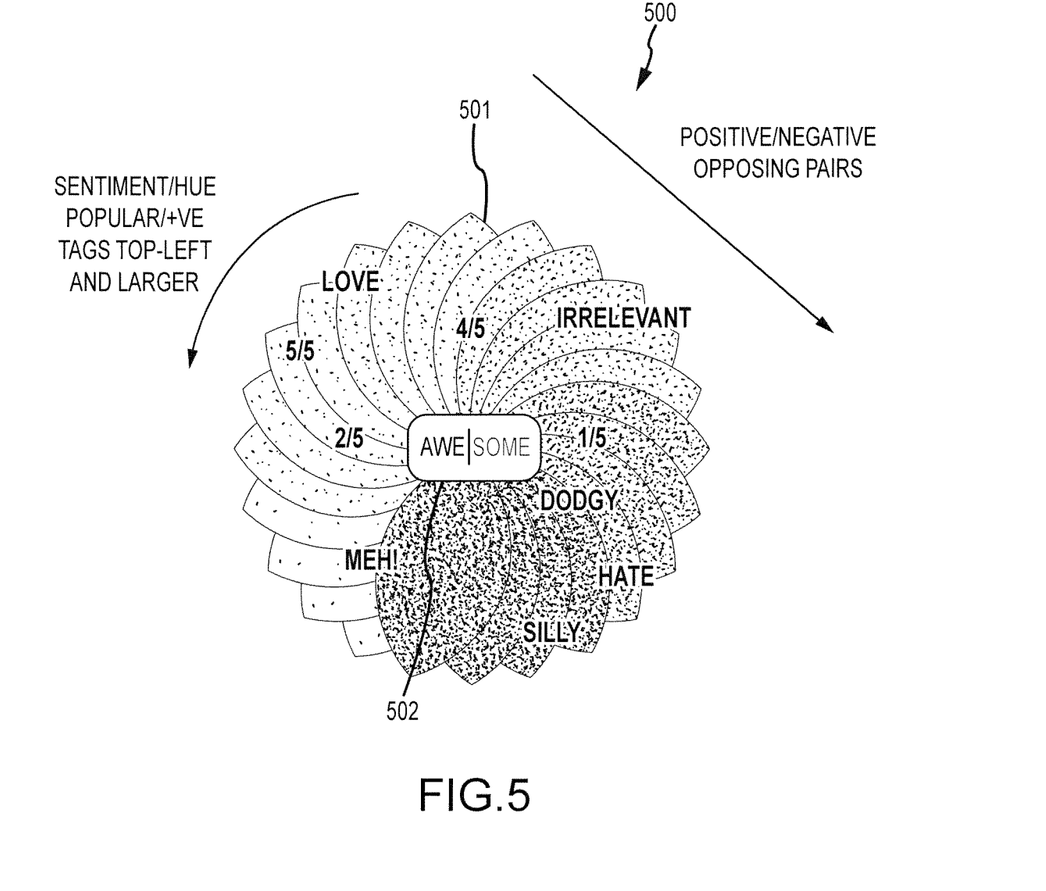
FIG. 5 displays another example user interface displayed to the user in response to a user request to tag content.

The set of suggested user-generated labels may be transmitted to the local client application for display to the user. The local client application may provide the user-generated labels for display to the user in variety of layouts (e.g., within a wheel or a list of user-generated labels). FIGS. 4 and 5 provide example layouts of the set of selected user-generated labels, and are described in more detail below.

Upon being presented with the suggested user-generated labels, the user may select a suggested user-generated label (e.g., click on the user-generated label), or may alternatively input a new user-generated label (e.g., into a text entry box displayed at the graphical user interface). The system may provide the user with an auto-complete option, when the user enters a user-generated label not presented as a suggested user-generated label, by accessing the entire database of user-generated labels corresponding to the item. Upon detecting the user's selection, the system may send a tag notification to the tag server to update the collection of user-generated labels associated with the content (e.g., the fitness of the selected user-generated label may be incremented within the tag pool, where the user-generated label is an existing user-generated label, or added to the tag pool, in the case where the user-generated label is a new user-generated label inputted by the user).

In one instance, when a user-generated label inputted by a user is not already within the tag pool associated with the item, the system (e.g., tag server) may perform one or more word similarly analysis algorithms to determine whether closely similar words are included within the set of existing labels within the tag pool. The system may then determine that the new user-generated label is a close variation of an existing user-generated label (e.g., where a user-generated label is a misspelled or variation of spelling of an existing user-generated label), and may increase the fitness of the existing user-generated label. The new user-generated label may also be added to the tag pool or may be discarded where a close variation of the new user-generated label exists. Thus, the collection of user-generated labels for each item or content collection grows each time a user tags the content representing the item with a user-generated label.

III. Example Processes for Facilitating Tagging of Content

Figure 2:
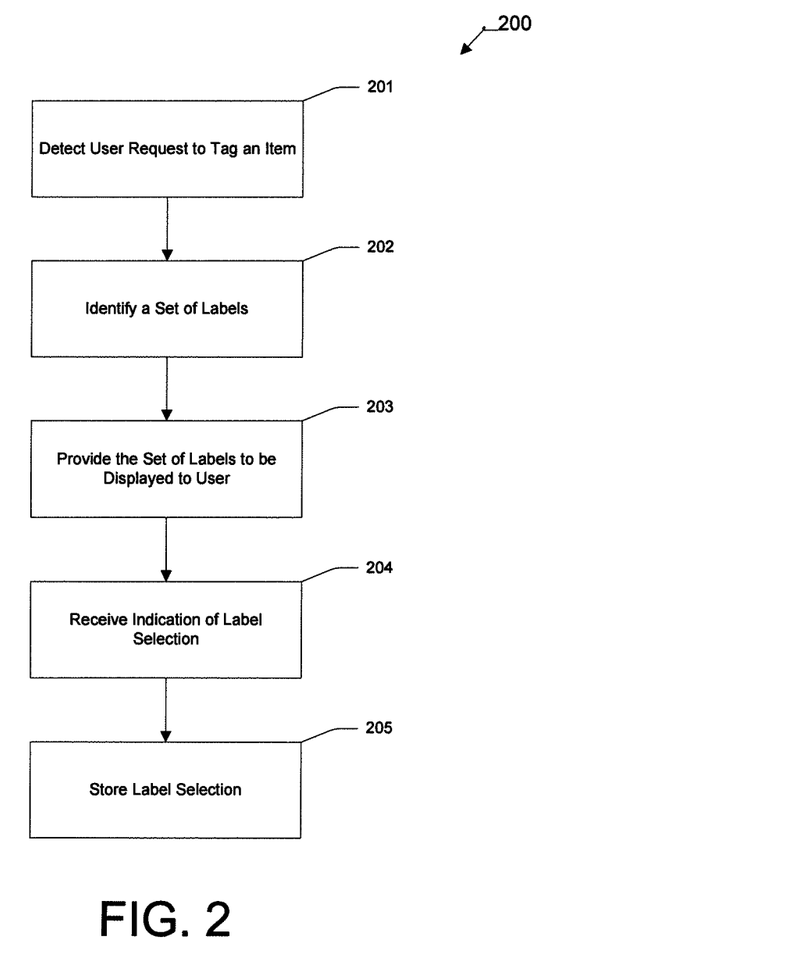
FIG. 2 illustrates a flow chart of an example process for facilitating tagging of content representing an item.

FIG. 2 illustrates a flow chart of an example process 200 for facilitating tagging of content (e.g., online content) representing an item. In step 201 the system (e.g., at the local client application) may receive an indication of a request to tag an item (e.g., represented by a collection of content). The request may be received in response to the user selecting a tag button or other selection mechanism provided to the user (e.g., at the user's client device). The system, upon receiving the indication, may identify a content identifier associated with the item and request a set of user-generated labels associated with the content (according to the content identifier).

In step 202, the system identifies a set of user-generated labels associated with the content (e.g., at the tag server). As described above, the user-generated labels may be selected based on their fitness according to a fitness proportionate selection. Furthermore, the set of user-generated labels may be selected and/or organized based on sentiment analysis (e.g., at the sentiment analysis server).

Next, in step 203, the set of user-generated labels are provided for display to the user. The set of user-generated labels may be displayed to the user in various layouts including but not limited to a list, a cloud, a wheel or other similar layouts. The manner in which the set of user-generated labels is displayed may be determined based on the fitness and/or sentiment analysis of the set of user-generated labels. FIGS. 4 and 5 provide example layouts of the set of selected user-generated labels, and are described in more detail below.

In step 204, the system receives an indication of selection of one of the displayed user-generated labels. Alternatively, the system may receive an indication of a manually inputted user-generated label (e.g., a user-generated label that was not displayed to the user within the set of user-generated labels). In step 205, the system stores the user-generated label within the appropriate one or more databases associated with the content.

Figure 3:
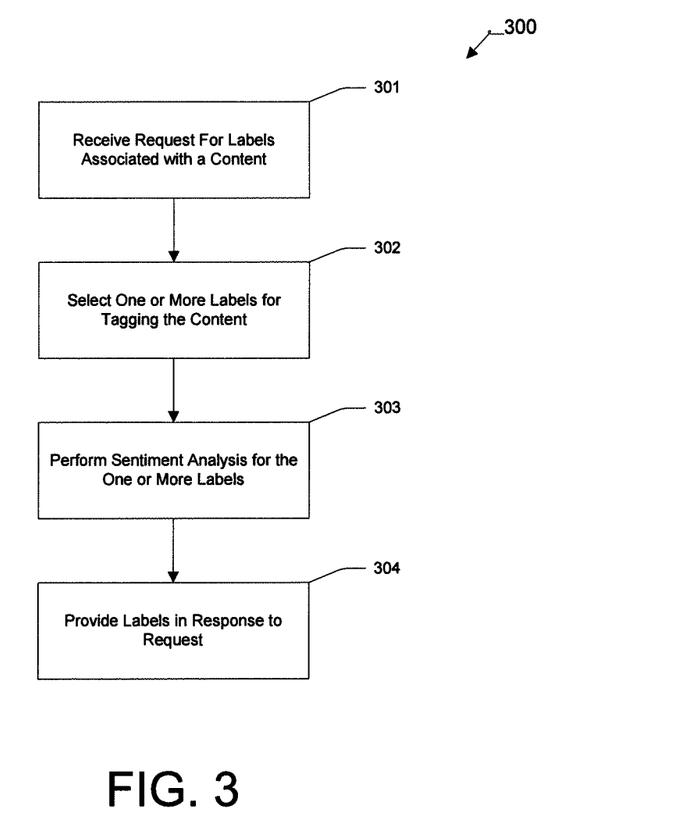
FIG. 3 illustrates a flow chart of an example process for selecting a set of user-generated labels for suggestion to the user.

FIG. 3 illustrates a flow chart of an example process 300 for selecting a set of user-generated labels for suggestion to the user. The process begins in step 301 when the system receives a request for user-generated labels (e.g., at the tag server). The request may include a content identifier for the content associated with the requested set of tags. The request may be received in response to a request from a user to tag the content (e.g., an indication of a user request received at the local client application).

In step 302, the system (e.g., tag server) selects one or more user-generated labels associated with the content identifier. The system may have access to a database storing a pool of user-generated labels associated with the content and the system may identify the content using the content identifier and may access the database maintaining a tag pool associated with the content to select one or more user-generated labels. The one or more user-generated labels may be selected based on a fitness proportionate selection algorithm, which selects user-generated labels from a plurality of user-generated labels within the tag pool according to the fitness of each of the user-generated labels within the tag pool. As a result of the fitness proportionate selection the system may select one or more user-generated labels. The system may further identify display information regarding the user-generated labels.

In step 303, the system may perform sentiment analysis on the selected one or more user-generated labels (e.g., at the sentiment analysis server). The sentiment analysis may result in additional user-generated labels (e.g., user-generated labels related to the one or more selected user-generated labels according to their sentiment) and/or display information for a manner of displaying the selected one or more user-generated labels. In step 304, the selected user-generated labels and/or the display information is provided in response to the request received in step 301.

IV. Example User Interface for Facilitating Tagging of Content

FIG. 4 displays an example user interface 400 displayed to the user in response to a user request to tag content. As illustrated, a listing of tags is displayed to the user within two separate lists including a positive sentiments list 401 and a negative sentiments list 402. Furthermore, the user-generated labels within each of the lists 401 and 402 are displayed in various sizes reflecting the popularity or fitness of the displayed user-generated labels. A text box 403 is further displayed to the user so that the user may type in user-generated labels not displayed within the list. When the user uses the text box 403 to type in the user-generated labels, an auto-completion list 404 may be presented to the user with user-generated labels that are available within the pool of user-generated labels associated with the content but were not displayed within lists 401 and 402. The tag auto-completion list 404 may further suggest user-generated labels that have been used with respect to other related content.

FIG. 5 displays another example user interface 500 displayed to the user in response to a user request to tag content. The user interface 500 is illustrated as a "fan" 501 that may unfold requests to tag an item (e.g., when the user clicks a tag button or other tag selection mechanism). Color, transparency and animation are used within the user interface 500 to create a visual experience for the user. The color (represented in FIG. 5 using density gradation) and circular layout of fan 501 reflect that the displayed user-generated labels cover a spectrum of opinions. User-generated label location (i.e., spatial location within the user interface 500) reflects sentiment. User-generated labels representing opposing sentiments are displayed diagonally opposite one another. The size of the user-generated label text reflects the popularity or fitness of each user-generated label in relation to the user-generated labels being displayed and/or all user-generated labels associated with the content (e.g., user-generated labels within the pool of user-generated labels associated with the content).

A text box 502 is further displayed to the user so that the user may type in user-generated labels not displayed within the list. When the user uses the text box 502 to type in the user-generated labels, auto-completion may be performed as the user is typing the user-generated label suggesting user-generated labels that are available within the pool of user-generated labels associated with the content (e.g., user-generated labels that were not displayed). The tag auto-completion may further suggest user-generated labels that have been used with respect to other related content.

As illustrated, the most positive and popular tags are displayed in the "happy-left-hand-corner". This positioning is based on the assumption that most users tend to look at this location within the user interface first. In lieu of the petals making up the fan 501, colored rays may alternatively be used to reflect the themes. In one instance, if the user is signed in, user-generated labels created by or previously selected by the user with respect to the specific content and/or related or other content may be highlighted or otherwise visually distinguished.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

V. Example System for Facilitating Tagging of Content

Figure 6:
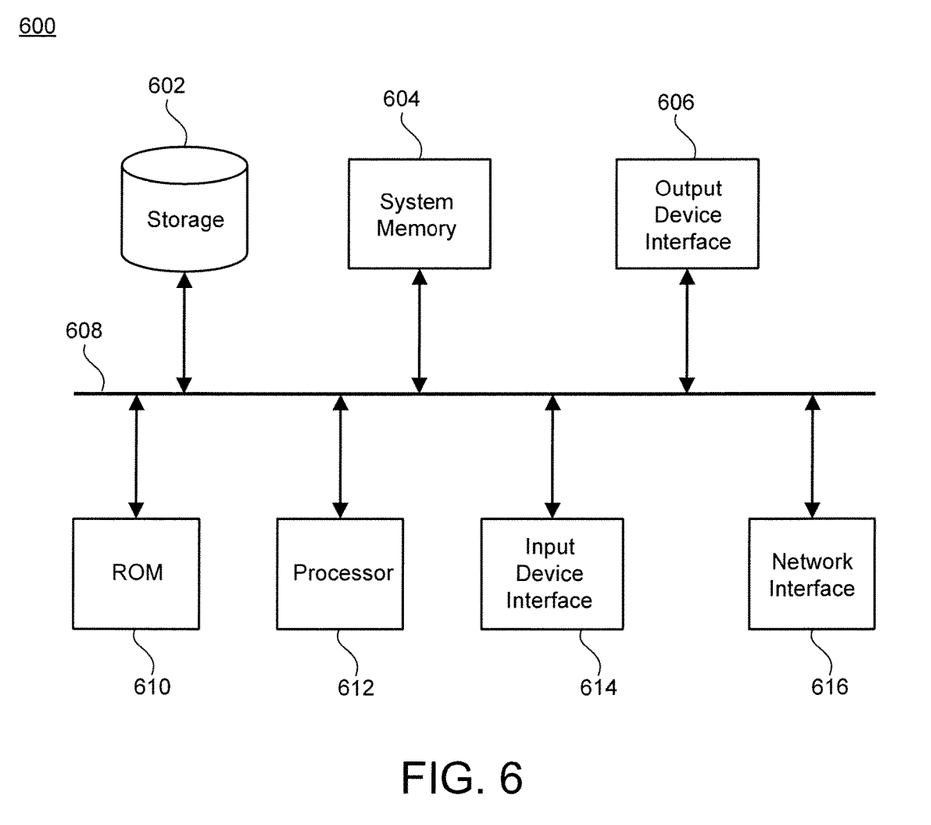
FIG. 6 conceptually illustrates an electronic system with which some implementations of the subject technology are implemented.

FIG. 6 conceptually illustrates an electronic system with which some implementations of the subject technology are implemented. Electronic system 600 can be a server, computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for providing a user with a mechanism for tagging items in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method executed on one or more computing devices for providing a user with a set of user-generated labels for tagging an item, the method comprising:
   providing, via an electronic network, an item of online content for display to a user at a computing device operably connected to the electronic network;
   receiving an indication of a request from a user to tag the item;
   identifying a user-generated label set comprising a plurality of user-generated labels uniquely associated with and representing a plurality of sentiments regarding the item, each user-generated label of the plurality of user-generated labels being provided via the electronic network by a respective user,
      wherein the plurality of user-generated labels are selected based on the respective sentiments of the user-generated labels and respective fitness values for the plurality of user-generated labels, and wherein a fitness value comprises a weighted popularity of association of a respective sentiment with the user-generated label as a function of time;
   determining, for each user-generated label of the selected user-generated labels, display characteristics including a relative spatial position of the user-generated label with respect to the other user-generated labels of the selected user-generated labels based on a comparison of the respective sentiments of the selected user-generated labels; and
   providing, via the electronic network, the selected user-generated labels for display to the user at the computing device according to the determined display characteristics, wherein the user may select a user-generated label from the displayed set or input a new user-generated label.

2. The method of claim 1, wherein identifying the plurality of user-generated labels comprises:
   identifying a content identifier corresponding to the item; and
   identifying the plurality of user-generated labels based on the content identifier.

3. The method of claim 2, wherein the content identifier comprises a Universal Resource Locator (URL) corresponding to the item.

4. The method of claim 2, wherein the content identifier comprises a qualified content identifier including a content identifier for locating the item and context information associated with the specific instance of the item that the user is interacting with.

5. The method of claim 1, wherein selecting the user-generated labels comprises:
   selecting using the one or more computing devices at least one of the selected user-generated labels from the plurality of user-generated labels based on a variance of the respective sentiments of the user-generated labels over a period of time.

6. The method of claim 1, wherein selecting the user-generated labels comprises selecting according to a fitness proportionate selection algorithm based on the fitness value of the user-generated labels.

7. The method of claim 1, further comprising:
   identifying, using the one or more computing devices, display information corresponding to displayed user-generated labels of the selected user-generated labels, wherein the display information indicates the manner in which the displayed user-generated labels are displayed to the user.

8. The method of claim 7, wherein the display information comprises information for visually representing an indication of the fitness value of each displayed user-generated label in relation to at least one other displayed user-generated label.

9. The method of claim 7, wherein the display information comprises information for visually representing an indication of the sentiment of each displayed user-generated label in relation to other displayed user-generated labels.

10. The method of claim 7, wherein the display information comprises information regarding one or more of the size of the visual representation of each displayed user-generated label of the displayed user-generated labels, a color of the visual representation of each displayed user-generated label of the displayed user-generated labels or a spatial location of the visual representation of each displayed user-generated label of the displayed user-generated labels.

11. The method of claim 1, further comprising:
   receiving an indication of a user-selection of a user-generated label of the selected user-generated labels by the user for tagging the item; and
   updating the fitness value of the user-selected user-generated label using the one or more computing devices to reflect the selection using the one or more computing devices.

12. The method of claim 1, further comprising:
   providing a graphical component for display along with the selected user-generated labels, the graphical component configured to enable the user to enter an alternative user-generated label corresponding to the item, wherein the alternative user-generated label is different from the selected user-generated labels.

13. The method of claim 12, further comprising:
   receiving an entry of an alternative user-generated label for tagging the item from the user within the graphical component; and
   updating the user-generated label set in response to receiving the entry.

14. The method of claim 13, wherein updating the user-generated label set comprises:
   determining if the alternative user-generated label is similar to an existing user-generated label of the plurality of user-generated labels;
   adding the alternative user-generated label to the plurality of user-generated labels if the alternative user-generated label is not similar to an existing user-generated label of the plurality of user-generated labels; and
   updating the fitness value of the existing user-generated label in response to the determination if the alternative user-generated label is similar to an existing user-generated label of the plurality of user-generated labels.

15. The method of claim 1, wherein the weighted popularity is based on a number of times the respective sentiment was associated with the item and each time at which the respective sentiment was associated with the item.

16. The method of claim 1, wherein in a case where a first user-generated label and a second user-generated label of the selected user-generated labels represent opposing sentiments, the relative spatial position of the first user-generated label is diagonally opposite to that of the second user-generated label.

17. A system for providing a user with user-generated labels for tagging content, the system comprising:
one or more processors; and
a machine-readable medium comprising instructions stored therein, which when executed by the processors, cause the processors to perform operations comprising:
receiving, via an electronic network, an indication of a request to tag online content representing an item being provided for display to a user at a computing device operably connected to the network, while the user is interacting with the content, the content comprising a content identifier;
identifying a collection of user-generated labels corresponding to the content identifier, each user-generated label of the collection being provided via the electronic network by a respective user, and representing a sentiment regarding the item, and being associated with a fitness value based on a weighted popularity of association of a respective sentiment with the user-generated label as a function of time, wherein selecting user-generated labels of the collection of user-generated labels is based on the fitness value of the user-generated labels;
determining, for each user-generated label of the selected user-generated labels, display characteristics including a relative spatial position of the user-generated label with respect to the other user-generated labels of the selected user-generated labels based on a comparison of the respective sentiments of the selected user-generated labels; and
providing, via the electronic network, the selected user-generated labels for display to the user at the computing device according to the determined display characteristics, wherein the user may select a user-generated label from the displayed collection or input a new user-generated label.

18. The system of claim 17, wherein selecting user-generated labels comprises selecting the user-generated labels from the collection of user-generated labels according to the fitness proportionate selection algorithm based on a selection probability of each of the user-generated labels, and wherein the selection probability of each user-generated label is based on its fitness value.

19. The system of claim 17, the operations further comprising:
identifying display information regarding the user-generated labels, the display information providing a visual representation of the fitness value and sentiment provided by each of the user-generated labels in relation to the other user-generated labels of the set of user-generated labels, wherein the display information includes one or more of size, color or location information for visually representing the user-generated labels; and
providing the user-generated labels for display to the user for tagging the item according to the display information, in response to the request.

20. The system of claim 17, wherein the weighted popularity is based on the number of times a user-generated label representing the respective sentiment has been selected for tagging the item and each time at which the user-generated label was used to tag the item.

21. A non-transitory machine-readable medium comprising instructions stored therein, which when executed by a machine, cause the machine to perform operations comprising:
detecting a user request to tag an item of online content, while the item is being displayed to the user at a computing device operably connected to an electronic network;
identifying a content identifier corresponding to the item;
selecting user-generated labels from a plurality of user-generated labels corresponding to the content identifier, each of the plurality of user-generated labels being provided via the electronic network by a respective user and representing a sentiment regarding the item, wherein the selection of a respective one of the user-generated labels is based on a fitness criteria and a relation of the sentiment represented by the respective user-generated label to a pre-defined set of basic emotions, the fitness criteria comprising a weighted popularity of association of the sentiment with the user-generated label as a function of time;
wherein the user-generated labels are selected to provide a full spectrum of sentiments regarding the item, such that at least two of the user-generated labels of the selected user-generated labels provide opposite sentiments from one another; and
determining, for each user-generated label of the selected user-generated labels, display characteristics including a relative spatial position of the user-generated label with respect to the other user-generated labels of the selected user-generated labels based on a comparison of the respective sentiments of the selected user-generated labels; and
providing, via the electronic network, the selected user-generated labels to be displayed to the user on a display area at the computing device based on the determined display characteristics, wherein the user may select a displayed user-generated label or input a new user-generated label.

22. The machine-readable medium of claim 21, wherein the weighted popularity is based on a number of times the sentiment was associated with the item and each time at which the sentiment was associated with the item.

* * * * *